United States Patent
Yamanaka et al.

(10) Patent No.: US 11,598,009 B2
(45) Date of Patent: Mar. 7, 2023

(54) SN-PLATED STEEL SHEET AND METHOD FOR MANUFACTURING SN-PLATED STEEL SHEET

(71) Applicant: NIPPON STEEL CORPORATION, Tokyo (JP)

(72) Inventors: Shintaro Yamanaka, Tokyo (JP); Masakazu Noda, Tokyo (JP); Yasuhiko Sato, Tokyo (JP); Nobuo Nakasone, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 179 days.

(21) Appl. No.: 16/975,637

(22) PCT Filed: Mar. 1, 2019

(86) PCT No.: PCT/JP2019/008222
§ 371 (c)(1),
(2) Date: Aug. 25, 2020

(87) PCT Pub. No.: WO2019/168179
PCT Pub. Date: Sep. 6, 2019

(65) Prior Publication Data
US 2020/0399765 A1  Dec. 24, 2020

(30) Foreign Application Priority Data
Mar. 1, 2018  (JP) ............... JP2018-036587

(51) Int. Cl.
*B32B 15/01* (2006.01)
*C23C 28/00* (2006.01)
(Continued)

(52) U.S. Cl.
CPC .......... *C23C 28/3455* (2013.01); *B32B 15/04* (2013.01); *B32B 15/043* (2013.01);
(Continued)

(58) Field of Classification Search
CPC ......... C23C 22/34; C23C 22/05; C23C 22/36; C23C 22/361; C23C 28/3455;
(Continued)

(56) References Cited

U.S. PATENT DOCUMENTS 4,999,258 A  3/1991  Wake et al.
8,679,643 B2  3/2014  Date

FOREIGN PATENT DOCUMENTS

EP  1 518 944 A1  3/2005
JP  63-290292 A  11/1988
(Continued)

OTHER PUBLICATIONS

"Surface Analysis Technology Selection X-ray Photoelectron Spectroscopy", Maruzen Co., LTD., The Surface Science Society of Japan, 1998, total 5 pages.
(Continued)

*Primary Examiner* — Michael E. La Villa
(74) *Attorney, Agent, or Firm* — Birch, Stewart, Kolasch & Birch, LLP (57) ABSTRACT

A Sn-plated steel sheet including a base plated steel sheet having a steel sheet, a Sn-plated layer on at least one surface of the steel sheet, and a film layer containing a zirconium oxide and a tin oxide. An adhesion amount of Sn per surface of the Sn-plated steel sheet is 0.1 g/m² or more and 15 g/m² or less, an amount of the zirconium oxide in the film layer is in a range of 1 mg/m² or more and 30 mg/m² or less in terms of an amount of metal Zr, a peak position of a binding energy of $Sn3d_{5/2}$ of the tin oxide is 1.4 eV or more and less than 1.6 eV from a peak position of a binding energy of metal Sn, and a quantity of electricity required for reduction of the tin oxide is more than 5.0 mC/cm² and 20 mC/cm² or less.

9 Claims, 2 Drawing Sheets

(51) Int. Cl.
  *C25D 9/10* (2006.01)
  *C25D 5/50* (2006.01)
  *C25D 9/00* (2006.01)
  *C25D 9/08* (2006.01)
  *C25D 5/48* (2006.01)
  *C23C 22/36* (2006.01)
  *B32B 15/04* (2006.01)
  *C23C 22/05* (2006.01)
  *C23C 30/00* (2006.01)
  *B32B 15/18* (2006.01)
  *C25D 3/30* (2006.01)
  *C23C 22/34* (2006.01)
  *C25D 5/36* (2006.01)

(52) U.S. Cl.
  CPC .............. *B32B 15/18* (2013.01); *C23C 22/05* (2013.01); *C23C 22/36* (2013.01); *C23C 22/361* (2013.01); *C23C 28/30* (2013.01); *C23C 28/32* (2013.01); *C23C 28/321* (2013.01); *C23C 28/322* (2013.01); *C23C 28/34* (2013.01); *C23C 28/345* (2013.01); *C23C 30/00* (2013.01); *C23C 30/005* (2013.01); *C25D 5/48* (2013.01); *C25D 5/50* (2013.01); *C25D 9/00* (2013.01); *C25D 9/08* (2013.01); *C25D 9/10* (2013.01); *C23C 22/34* (2013.01); *C25D 3/30* (2013.01); *C25D 5/36* (2013.01); *C25D 5/505* (2013.01); *Y10T 428/1259* (2015.01); *Y10T 428/12583* (2015.01); *Y10T 428/12611* (2015.01); *Y10T 428/12618* (2015.01); *Y10T 428/12667* (2015.01); *Y10T 428/12708* (2015.01); *Y10T 428/12722* (2015.01); *Y10T 428/12951* (2015.01); *Y10T 428/12972* (2015.01); *Y10T 428/12979* (2015.01)

(58) Field of Classification Search
  CPC ....... C23C 28/30; C23C 28/32; C23C 28/321; C23C 28/322; C23C 28/345; C23C 28/34; C23C 30/00; C23C 30/005; C25D 5/48; C25D 5/50; C25D 5/36; C25D 5/505; C25D 9/00; C25D 9/08; C25D 9/10; C25D 3/30; B32B 15/04; B32B 15/043; B32B 15/18; Y10T 428/12583; Y10T 428/1259; Y10T 428/12611; Y10T 428/12618; Y10T 428/1266; Y10T 428/12667; Y10T 428/12708; Y10T 428/12722; Y10T 428/12951; Y10T 428/12972; Y10T 428/12979
  See application file for complete search history.

(56) References Cited

FOREIGN PATENT DOCUMENTS

| | | |
|---|---|---|
| JP | 2004-60052 A | 2/2004 |
| JP | 2007-284789 A | 11/2007 |
| JP | 2010-13728 A | 1/2010 |
| JP | 2011-174172 A | 9/2011 |
| JP | 2013-237922 A | 11/2013 |
| KR | 10-1784767 B1 | 10/2017 |

OTHER PUBLICATIONS

"Tinplate and blackplate", JIS G 3303, 2008, total 11 pages.

SN-PLATED STEEL SHEET AND METHOD FOR MANUFACTURING SN-PLATED STEEL SHEET

TECHNICAL FIELD OF THE INVENTION

The present invention relates to a Sn-plated steel sheet and a method for manufacturing a Sn-plated steel sheet.

Priority is claimed on Japanese Patent Application No. 2018-036587 filed on Mar. 1, 2018, the content of which is incorporated herein by reference.

RELATED ART

Tin (Sn)-plated steel sheets are well known as "tin plate" and are widely used for cans such as beverage cans and food cans and for other uses. This is because Sn is safe for the human body and is an attractive metal. This Sn-plated steel sheet is mainly manufactured by an electro plating method. This is because the electro plating method is more advantageous than a hot-dip plating method for controlling the use amount of Sn, which is a relatively expensive metal, to the necessary minimum amount. After the Sn-plated steel sheet is given an attractive metallic luster by a heating and melting treatment after plating, a chromate film is often formed on the Sn plating by a chromate treatment such as an electrolytic treatment using a hexavalent chromate solution or an immersion treatment. The effect of this chromate film is to prevent the yellowing of the external appearance by suppressing the oxidation of the surface of the Sn plating, to prevent the deterioration of coating film adhesion caused by cohesive fracture of a tin oxide when coated and used, to improve sulphide stain resistance, and the like.

On the other hand, in recent years, with an increasing awareness of the environment and safety, it has been required not only that hexavalent chromium not be contained in the final product but also that the chromate treatment itself not be performed. However, as described above, a Sn-plated steel sheet having no chromate film has a yellowed external appearance, decreases in coating film adhesion, and decreases sulphide stain resistance due to the growth of a tin oxide.

For this reason, several Sn-plated steel sheets which have been subjected to a film treatment in place of the chromate film have been proposed.

For example, Patent Document 1 below proposes a Sn-plated steel sheet in which a film containing P and Si is formed by a treatment using a solution containing phosphate ions and a silane coupling agent. Patent Document 2 below proposes a Sn-plated steel sheet in which a film containing a reaction product of Al and P, at least one of Ni, Co, and Cu. and a silane coupling agent is formed by a treatment using a solution containing aluminum phosphate. Patent Document 3 below proposes a method for manufacturing a Sn-plated steel sheet having no chromate film, in which a Zn plating is applied onto a Sn plating, and a heating treatment is then performed thereon until only an Zn-plated layer disappears. Patent Documents 4 and 5 below propose a steel sheet for a container having a chemical conversion film containing zirconium, phosphoric acid, a phenol resin, and the like.

PRIOR ART DOCUMENT

[Patent Document]
[Patent Document 1] Japanese Unexamined Patent Application, First Publication No. 2004-60052
[Patent Document 2] Japanese Unexamined Patent Application, First Publication No. 2011-174172
[Patent Document 3] Japanese Unexamined Patent Application, First Publication No. S63-290292
[Patent Document 4] Japanese Unexamined Patent Application, First Publication No. 2007-284789
[Patent Document 5] Japanese Unexamined Patent Application, First Publication No. 2010-13728

Non-Patent Document

[Non-Patent Document 1] "Surface Analysis Chemistry Selection: X-ray Photoelectron Spectroscopy" edited by The Surface Science Society of Japan. Maruzen Publishing Co., Ltd., p. 83

DISCLOSURE OF THE INVENTION

Problems to be Solved by the Invention

However, as a result of examinations by the present inventors, it became clear that the Sn-plated steel sheets and the manufacturing methods proposed in Patent Documents 1 to 5 could not sufficiently suppress the growth of a tin oxide over time, and there were cases where the yellowing resistance and coating film adhesion were insufficient.

The present invention has been made in view of the above-described problems, and an object thereof is to provide a Sn-plated steel sheet which is superior in yellowing resistance, coating film adhesion, and sulphide stain resistance without being subjected to a chromate treatment which is performed in the related art, and a method for manufacturing a Sn-plated steel sheet.

Means for Solving the Problem

In order to solve the problems, the present inventors carried out intensive examinations. As a result, it was found that it is possible to realize a Sn-plated steel sheet which is superior in yellowing resistance, coating film adhesion, and sulphide stain resistance without being subjected to a chromate treatment, by forming a layer containing a zirconium oxide and a tin oxide on the surface of the Sn-plated steel sheet. The gist of the present invention based on the above findings is as follows.

[1] A Sn-plated steel sheet according to an aspect of the present invention includes: a base plated steel sheet having a steel sheet, and a Sn-plated layer on at least one surface of the steel sheet; and a film layer which contains a zirconium oxide and a tin oxide and is positioned on the base plated steel sheet, in which an adhesion amount of Sn per surface is 0.1 g/m$^2$ or more and 15 g/m$^2$ or less, an amount of the zirconium oxide in the film layer is in a range of 1 mg/m$^2$ or more and 30 mg/m$^2$ or less in terms of an amount of metal Zr, a peak position of a binding energy of Sn3d$_{5/2}$ of the tin oxide by X-ray photoelectron spectroscopy in the film layer is within a range of 1.4 eV or more and less than 1.6 eV from a peak position of a binding energy of metal Sn, and a quantity of electricity required for reduction of the tin oxide is in a range of more than 5.0 mC/cm$^2$ and 20 mC/cm$^2$ or less.

[2] A method for manufacturing a Sn-plated steel sheet according to another aspect of the present invention, includes: a first step of forming a zirconium oxide layer containing a zirconium oxide on a base plated steel sheet which has a Sn-plated layer containing 0.1 g/m$^2$ or more and 15 g/m$^2$ or less of Sn formed on at least one surface of a steel sheet, by performing an immersion treatment into a solution containing zirconium ions, or a cathodic electrolysis treatment in a solution containing zirconium ions; and a second step of, after the first step, subjecting the base plated steel sheet on which the zirconium oxide layer is formed to a heating treatment in an atmosphere containing oxygen under conditions satisfying both Formula 1 and Formula 2 regarding a heating temperature T in units of K and a heating time t in units of hours.

$$0.11 \times \exp(2400/T) < t < 0.65 \times \exp(2400/T) \quad \text{(Formula 1)}$$

$$308 < T < 373 \quad \text{(Formula 2)}$$

[3] In the aspect according to [2], the heating treatment in the second step may be performed in an atmosphere containing oxygen and having a water vapor content in a range of 60 vol % or more and 90 vol % or less.

[4] In the aspect according to [2] or [3], a concentration of the zirconium ions in the solution containing the zirconium ions may be 100 ppm or more and 4.000 ppm or less, and a pH value of the solution containing the zirconium ions may be 3 or more and 5 or less.

[5] In the aspect according to any one of [2] to [4], in the first step, the zirconium oxide layer may be formed by the cathodic electrolysis treatment, and a current density in the cathodic electrolysis treatment may be set to 0.05 A/dm$^2$ or more and 50 A/dm$^2$ or less.

Effects of the Invention

As described above, according to the above aspects of the present invention, it is possible to provide a Sn-plated steel sheet which is superior in yellowing resistance, coating film adhesion, and sulphide stain resistance without being subjected to a chromate treatment, which is performed in the related art, and a method for manufacturing a Sn-plated steel sheet.

EMBODIMENTS OF THE INVENTION

Hereinafter, an embodiment of the present invention will be described in detail.

The present embodiment described below relates to a Sn-plated steel sheet widely used for cans such as food cans and beverage cans or for other uses, and a method for manufacturing the Sn-plated steel sheet. More specifically, the present invention relates to a Sn-plated steel sheet which is superior in yellowing resistance, coating film adhesion, and sulphide stain resistance without being subjected to a chromate treatment, which is performed in the related art, and a method for manufacturing the Sn-plated steel sheet.
(Sn-Plated Steel Sheet)

Figure 1:
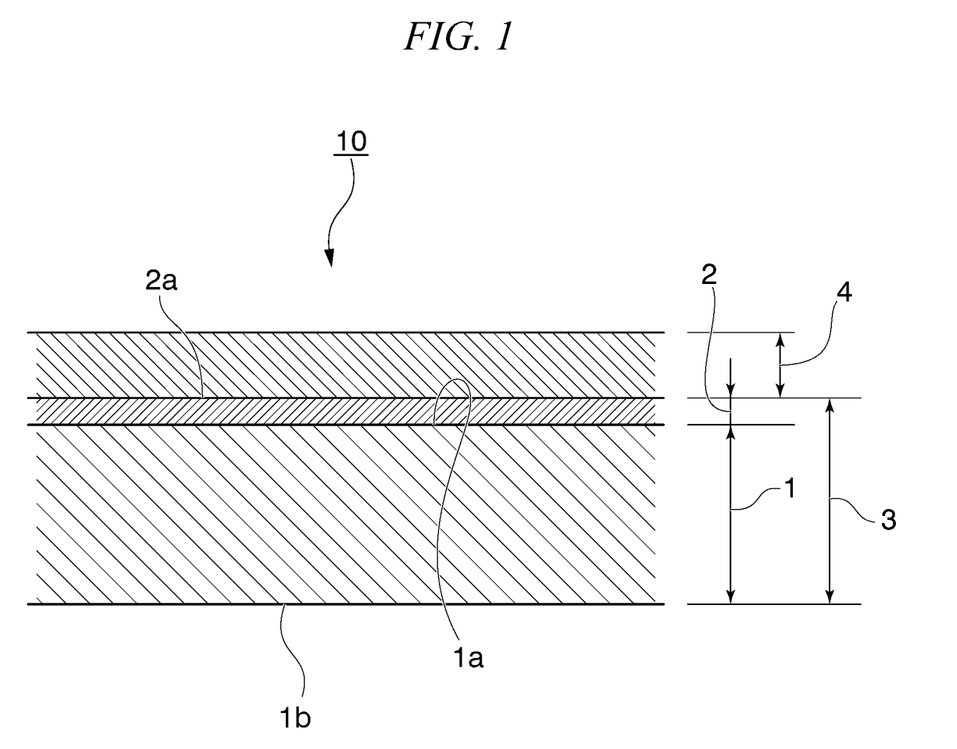
FIG. 1 is a view illustrating a Sn-plated steel sheet according to an embodiment of the present invention, and is a cross-sectional view taken along a sheet thickness direction thereof.

As illustrated in FIG. 1, a Sn-plated steel sheet 10 according to the present embodiment has a film layer 4 containing a predetermined amount of a zirconium oxide and a tin oxide on the surface of a base plated steel sheet 3 in which a Sn-plated layer 2 is formed on at least one surface 1a of a steel sheet 1.

More specifically, the Sn-plated steel sheet 1 according to the present embodiment includes the base plated steel sheet 3 having the Sn-plated layer 2 formed on at least one surface of the steel sheet 1, and the film layer 4 which contains the zirconium oxide and the tin oxide and is positioned on the base plated steel sheet 3, and the adhesion amount of Sn per surface in the Sn-plated layer 2 is 0.1 g/m$^2$ or more and 15 g/m$^2$ or less.

Although FIG. 1 illustrates a case where the Sn-plated layer 2 and the film layer 4 are formed in this order only on the surface 1a, which is one surface of the steel sheet 1, the Sn-plated layer 2 and the film layer 4 are not limited to this form. That is, in addition to the above configuration, a case where the Sn-plated layer 2 and the film layer 4 are formed in this order on a rear surface 1b of the steel sheet 1 is also included. In a case where the Sn-plated layer 2 is formed on both surfaces in this manner, the adhesion amount of Sn in the Sn-plated layer 2 formed on the surface 1a is 0.1 g/m$^2$ or more and 15 g/m$^2$ or less, and at the same time, the adhesion amount of Sn in the Sn-plated layer 2 formed on the rear surface 1b may be 0.1 g/m$^2$ or more and 15 g/m$^2$ or less. In addition, the Sn-plated layers 2 are formed on both surfaces of the steel sheet 1, and while the adhesion amount of Sn of the Sn-plated layer 2 in one of the surfaces is 0.1 g/m$^2$ or more and 15 g/m$^2$ or less, the adhesion amount of Sn of the Sn-plated layer 2 in the other may be outside the range of 0.1 g/m$^2$ or more and 15 g/m$^2$ or less.

In the Sn-plated steel sheet 10 according to the present embodiment, the amount of the zirconium oxide in the film layer 4 is 1 mg/m$^2$ or more and 30 mg/m$^2$ or less per surface in terms of the amount of metal Zr. In the Sn-plated steel sheet 10 according to the present embodiment, the peak position of the binding energy of Sn3d$_{5/2}$ of the tin oxide by X-ray photoelectron spectroscopy (XPS) in the film layer 4 is in a range of 1.4 eV or more and less than 1.6 eV from the peak position of the binding energy of metal Sn, and the quantity of electricity required for reduction of the tin oxide is in a range of more than 5.0 mC/cm$^2$ and 20 mC/cm$^2$ or less.

When the amount of the zirconium oxide in the film layer 4 and the peak position of the binding energy of Sn3d$_{5/2}$ by XPS are measured, it is necessary to exclude the influence of contamination of the outermost layer of the film layer 4 on the measurement accuracy. For this, it is preferable that the outermost layer of the film layer 4 be etched, and measurement be performed within a range from a position slightly inside the film layer 4 (for example, a position 0.5 nm deeper than the surface layer position before the etching) to a position at a depth of 5 nm.

Hereinafter, the Sn-plated steel sheet 10 having the above configuration will be described in detail.
<Steel Sheet 1>

The steel sheet 1 used as the base metal of the Sn-plated steel sheet 10 according to the present embodiment is not particularly limited, and any steel sheet used as a general Sn-plated steel sheet for a container can be used. Examples of the steel sheet 1 include low carbon steel and ultra low carbon steel. Also, the manufacturing method and the material of the steel sheet 1 to be used are not particularly limited, and for example, a steel sheet manufactured through steps such as casting, hot rolling, pickling, cold rolling, annealing, and temper rolling can be used as appropriate.
<Sn-Plated Layer 2>

At least one surface of the steel sheet 1 as described above is subjected to Sn plating to form the Sn-plated layer 2. With the Sn-plated layer 2, the corrosion resistance after coating of the steel sheet 1 is improved. In the present specification, "Sn plating" includes not only the plating with metal Sn but also plating in which impurities are incorporated in metal Sn and plating in which small amounts of elements are contained in metal Sn.

A method of applying Sn plating to the surface 1a of the steel sheet 1 is not particularly limited. For example, a known electro plating method is preferable, and a dipping method in which the steel sheet 1 is immersed in molten Sn to be plated may be used. As the electro plating method, for example, a known electrolytic method using a Ferrostan bath, a halogen bath, an alkaline bath, or the like can be used.

After the Sn plating, a heating and melting treatment of heating the steel sheet 1 to which the Sn-plated layer 2 is applied to 231.9° C. or higher, which is the melting point of Sn, may be performed. By this heating and melting treatment, the surface of the Sn-plated steel sheet 10 becomes glossy, and an alloy layer of Sn and Fe is formed between the Sn plating 2 and the steel sheet 1, whereby the corrosion resistance after coating is further improved.

<Film Layer 4 Containing Zirconium Oxide and Tin Oxide>

The Sn-plated steel sheet 10 according to the present embodiment has the film layer 4 containing both the zirconium oxide and the tin oxide on the surface of the base plated steel sheet 3 having the above-described Sn-plated layer 2. As described above, the amount of the zirconium oxide in the film layer 4 is in a range of 1 mg/m$^2$ or more and 30 mg/m$^2$ or less per surface in terms of the amount of metal Zr. Regarding the tin oxide in the film layer 4, the peak position of the binding energy of Sn3d$_{5/2}$ by XPS is within a range of 1.4 eV or more and less than 1.6 eV from the peak position of the binding energy of metal Sn, and the quantity of electricity required for reduction of the tin oxide is in a range of more than 5.0 mC/cm$^2$ and 20 mC/cm$^2$ or less.

The "Sn3d$_{5/2}$" means the energy level of electrons in Sn as described in Non-Patent Document 1. More specifically, in Sn, Sn3d$_{5/2}$ means the energy level of 3d electrons whose spins are in a parallel state.

The Sn-plated steel sheet 10 according to the present embodiment has the above-described film layer 4 in which the zirconium oxide and the tin oxide coexist on the surface 2a of the Sn-plated layer 2, thereby further improving yellowing resistance, coating film adhesion, and sulphide stain resistance. The yellowing resistance, coating film adhesion, and sulphide stain resistance cannot be sufficiently improved with only the zirconium oxide or only the tin oxide. Although the reason for this is not clear, the following is considered as a result of a detailed investigation by the present inventors.

In the related art, a tin oxide has been regarded as a cause of yellowing. However, as a result of examinations by the present inventors, it was found that when a uniform and sufficient amount of tin oxide is formed on a Sn-plated steel sheet, yellowing resistance tends to be improved. In addition, it was found that when a uniform and sufficient amount of tin oxide is formed on the Sn-plated steel sheet, the sulphide stain resistance also tends to be improved in addition to the improvement in yellowing resistance. It is considered that this is because the yellowing occurs due to the repetition of the elution and oxidation of micro tin metal on the Sn-plated steel sheet, whereas the elution of micro tin metal can be suppressed by coating of the Sn-plated surface with the tin oxide. In order to obtain such an effect, the amount of the tin oxide needs to be set such that the quantity of electricity required for reduction of the tin oxide is in a range of more than 5.0 mC/cm$^2$ and 20 mC/cm$^2$ or less. In a case where the quantity of electricity required for the reduction of the tin oxide is more than 20 mC/cm$^2$, the coating film adhesion is poor, which is not preferable. The lower limit of the quantity of electricity required for the reduction of the tin oxide is preferably 7.0 mC/cm$^2$, and more preferably 8 mC/cm$^2$. The upper limit of the quantity of electricity required for the reduction of the tin oxide is preferably 15 mC/cm$^2$, and more preferably 12 mC/cm$^2$. In addition, "the quantity of electricity required for the reduction of the tin oxide" indicates the quantity of electricity obtained as the product of the time and current value required to reduce and remove the tin oxide in the film layer 4 of the Sn-plated steel sheet 10, and becomes a numerical value substantially corresponding to the amount (film thickness) of the film layer 4.

In order to obtain the above-described effects of the tin oxide, the zirconium oxide needs to coexist in the film layer 4. This is because the zirconium oxide improves the brittleness of the film containing the tin oxide and improves the coating film adhesion. In addition, the zirconium oxide itself has an effect of improving the sulphide stain resistance. In order to obtain such an effect, the amount of the zirconium oxide needs to be in a range of 1 mg/m$^2$ or more and 30 mg/m$^2$ or less in terms of the amount of metal Zr. In a case where the amount of metal Zr is less than 1 mg/m$^2$, embrittlement of the film containing the tin oxide cannot be suppressed. On the other hand, in a case where the amount of metal Zr exceeds 30 mg/m$^2$, the amount of the zirconium oxide is excessive, which leads to a reduction in the coating film adhesion. The lower limit of the amount of the zirconium compound is preferably 3 mg/m$^2$, and more preferably 5 mg/m$^2$. The upper limit of the amount of the zirconium compound is preferably 10 mg/m$^2$, and more preferably 8 mg/m$^2$.

Regarding the tin oxide, the peak position of the binding energy of Sn3d$_{5/2}$ by XPS needs to be within a range of 1.4 eV or more and less than 1.6 eV from the peak position of the binding energy of metal Sn. In a case where the tin oxide has a binding energy value outside the above range, the coating film adhesion is unstable.

The film layer 4 containing the zirconium oxide and the tin oxide may be in a mixed state of both, or may be a solid solution of the oxides, regardless of the existing state. There is no problem even if these oxides further contain any element such as P, Fe, Ni, Cr, Ca. Na, Mg, Al, and Si. That is, as the components of the film layer 4, other components (such as a phosphorus compound and a fluoride) may be further contained in addition to the zirconium oxide and the tin oxide.

Here, the adhesion amount of Zr is a value measured by immersing the Sn-plated steel sheet 10 having the film layer 4 according to the present embodiment formed on the surface thereof into, for example, an acidic solution such as hydrofluoric acid and sulfuric acid and dissolving the Sn-plated steel sheet 10, and subjecting the obtained solution to chemical analysis such as inductively coupled plasma (ICP) atomic emission spectrometry. Alternatively, the adhesion amount of Zr may be obtained by X-ray fluorescence measurement.

The quantity of electricity required for the reduction of the tin oxide is measured by the following method. That is, in a 0.001 mol/L aqueous solution of hydrobromic acid from which dissolved oxygen has been removed by bubbling of nitrogen gas or the like, the Sn-plated steel sheet 10 according to the present embodiment is subjected to cathodic electrolysis at a constant current of 0.06 mA/cm$^2$. In this case, the quantity of electricity required for the reduction of the tin oxide can be obtained from the product of the time and current value required for reducing and removing the tin oxide.

The peak position of the binding energy of $Sn3d_{5/2}$ by XPS can be measured by a known method using a known XPS measuring device.

<Adhesion Amount Sn of Sn-Plated Steel Sheet>

In the Sn-plated steel sheet 10 according to the present embodiment, the adhesion amount of Sn per surface is set to 0.1 g/m² or more and 15 g/m² or less in terms of the amount of metal Sn. As described in detail below, the film layer 4 of the Sn-plated steel sheet 10 according to the present embodiment is formed by causing Sn in the Sn-plated layer 2 to diffuse into the zirconium oxide layer by performing a heating treatment on the Sn-plated steel sheet (material) on which a zirconium oxide layer is formed under predetermined conditions. Therefore, in the Sn-plated steel sheet 10 according to the present embodiment, the adhesion amount of Sn per surface is the sum of the amount of Sn, which is present in the Sn-plated layer 2 and not diffused into the film layer 4, and the amount of the tin oxide present in the film layer 4 in terms of the amount of metal Sn.

In the Sn-plated steel sheet 10 according to the present embodiment, in a case where the adhesion amount of Sn per surface is less than 0.1 g/m², the corrosion resistance after coating is poor, which is not preferable. In a case where the adhesion amount of Sn per surface exceeds 15 g/m², the effect of improving the corrosion resistance after coating by Sn is sufficient, and a further increase in the adhesion amount of Sn is not preferable from an economic viewpoint and tends to decrease the coating film adhesion. In the Sn-plated steel sheet 10 according to the present embodiment, the lower limit of the adhesion amount of Sn per surface is preferably 1.0 g/m², and more preferably 2.0 g/m². The upper limit of the adhesion amount of Sn per surface is preferably 10 g/m², and more preferably 7.0 g/m².

Here, the adhesion amount of Sn per surface as described above is a value measured by, for example, an electrolytic method or an X-ray fluorescence method described in JIS G 3303.

(Method for Manufacturing Sn-Plated Steel Sheet 10)

Hereinafter, a method for manufacturing the Sn-plated steel sheet according to the present embodiment will be described in detail. In the method for manufacturing the Sn-plated steel sheet according to the present embodiment, the base plated steel sheet 3 in which the Sn-plated layer 2 is formed on at least one surface of the steel sheet 1 so that the adhesion amount of Sn per surface is 0.1 g/m² or more and 15 g/m² or less is used as a material.

Here, the method for manufacturing the base plated steel sheet 3 is not particularly limited, and the base plated steel sheet 3 can be manufactured by performing Sn plating on the known steel sheet 1 having a desired mechanical strength (for example, tensile strength) by a known plating method so that the adhesion amount of the Sn plating per surface is 0.1 g/m² or more and 15 g/m² or less. In addition, a known Sn-plated steel sheet (material) that has been subjected to Sn plating in advance so that the adhesion amount per surface is within the above range can also be used as the base plated steel sheet 3.

Subsequently, a method for forming the film layer 4 containing the zirconium oxide and the tin oxide will be described in detail. In order to form the film layer 4 according to the present embodiment, first, a zirconium oxide layer containing the zirconium oxide is formed on the Sn-plated layer 2 included in the base plated steel sheet 3.

The zirconium oxide layer containing the zirconium oxide can be formed on the base plated steel sheet 3 by subjecting the base plated steel sheet 3 on which the Sn-plated layer 2 is formed as described above to an immersion treatment into a solution containing zirconium ions, or a cathodic electrolysis treatment in a solution containing zirconium ions.

However, in the immersion treatment, since the zirconium oxide layer containing the zirconium oxide is formed by etching the surface of the base plated steel sheet 3 serving as a base material, the adhesion amount tends to be non-uniform, and the treatment time increases. Therefore, the immersion treatment is disadvantageous in terms of industrial productivity. On the other hand, in the cathodic electrolysis treatment, a uniform film can be obtained by the effect of forced charge transfer and surface cleaning due to the generation of hydrogen at the steel sheet interface, together with the effect of promoting adhesion by an increase in pH value. Furthermore, in the cathodic electrolysis treatment, since nitrate ions and ammonium ions coexist in the treatment solution, the treatment can be completed within a short time of several seconds to several tens of seconds, which is extremely industrially advantageous. Therefore, in forming of the zirconium oxide layer containing the zirconium oxide according to the present embodiment, it is preferable to use a method by cathodic electrolysis (cathodic electrolysis treatment).

In the following, the case where the zirconium oxide layer is formed by performing the cathodic electrolysis treatment will be described in detail. However, conditions regarding the solution other than the conditions specific to the cathodic electrolysis treatment, such as current density, are similarly applicable to the case of forming the zirconium oxide layer by the immersion treatment.

Here, the concentration of zirconium ions in the solution for performing the cathodic electrolysis treatment may be appropriately adjusted according to production facilities and production speed (capacity). For example, the concentration of zirconium ions in the solution is preferably 100 ppm or more and 4,000 ppm or less. There is no problem even if other components such as fluorine ions, ammonium ions, nitrate ions, and sulfate ions are contained in the solution containing zirconium ions.

Here, the temperature of the solution to be subjected to cathodic electrolysis (cathode electrolyte) is not particularly limited, but is preferably, for example, in a range of 10° C. or higher and 50° C. or lower. By performing cathodic electrolysis at 50° C. or lower, it is possible to form a dense and uniform film structure formed of very fine particles. On the other hand, in a case where the solution temperature is lower than 10° C., the efficiency of film formation is poor. In a case where the outside temperature is high such as in summer, the solution needs to be cooled, which is not economical and may also reduce the corrosion resistance after coating. In a case where the solution temperature exceeds 50° C., the zirconium oxide film structure to be formed becomes non-uniform, and defects, cracks, microcracks, and the like occur, which cause difficulty in forming a dense film and may become the origin of corrosion and the like, which is not preferable.

The pH value of the cathode electrolyte is not particularly specified, but is preferably 3 or more and 5 or less. In a case where the pH value is less than 3, there is a possibility that the zirconium oxide generation efficiency may decrease. In a case where the pH value exceeds 5, a large amount of precipitate is generated in the solution, and there is a possibility that continuous productivity may be reduced.

In order to adjust the pH value of the cathode electrolyte or to improve the electrolysis efficiency, the cathode electrolyte may contain, for example, nitric acid or ammonia water. In particular, in order to realize a reduction in the time required for the cathodic electrolysis treatment, it is preferable to include nitric acid and ammonia water in the cathode electrolyte.

In addition, the current density in the cathodic electrolysis treatment is preferably, for example, in a range of 0.05 A/dm$^2$ or more and 50 A/dm$^2$ or less. In a case where the current density is less than 0.05 A/dm$^2$, the formation efficiency of the zirconium oxide is lowered, and it is difficult to stably form a film layer containing the zirconium oxide, the yellowing resistance and sulphide stain resistance decrease, and there is also a possibility that the corrosion resistance after coating may decrease, which is not preferable. On the other hand, in a case where the current density is more than 50 A/dm$^2$, the formation efficiency of the zirconium oxide is too high, and there is a possibility that a zirconium oxide which is coarse and has poor adhesion may be formed, which is not preferable. The lower limit of the range of the current density is more preferably 1 A/dm$^2$, and even more preferably 2 A/dm$^2$. The upper limit of the range of the current density is more preferably 10 A/dm$^2$, and even more preferably 6 A/dm$^2$.

In forming of the zirconium oxide layer, the time needed for the cathodic electrolysis is not a problem. The time needed for the cathodic electrolysis may be appropriately adjusted in accordance with the current density with respect to a target adhesion amount of Zr. For example, in a case where the cathodic electrolysis treatment is performed in the above-described current density range, the energizing time may be set to about 0.3 to 5 seconds.

Further, as the solvent of the solution used in the cathodic electrolysis treatment, for example, distilled water or the like can be used. However, the solvent is not limited to water such as distilled water, and can be appropriately selected depending on the material to be dissolved, the forming method, and the like.

As the zirconium in the cathodic electrolysis, for example, a zirconium complex such as H$_2$ZrF$_6$ can be used as a source of zirconium. Zr in the zirconium complex as described above becomes Zr$^{4+}$ with an increase of the pH value at the cathode electrode interface, and is present in the cathode electrolyte. Such zirconium ions further react in the cathode electrolyte to form the zirconium oxide. In a case where phosphoric acid is contained in the electrolytic solution, zirconium phosphate is also formed.

Furthermore, there is no problem whether the energization pattern at the time of cathodic electrolysis is continuous energization or intermittent energization.

The film layer 4 containing the zirconium oxide and the tin oxide according to the present embodiment is obtained by subjecting the base plated steel sheet 3 on which the zirconium oxide layer containing the zirconium oxide is formed to a heating treatment under predetermined conditions. Specifically, the zirconium oxide layer is formed on the Sn-plated layer 2 of the base plated steel sheet 3 and is thereafter heated in an atmosphere containing oxygen under conditions that satisfy both Formula 101 and Formula 102 regarding a temperature T (unit: K) and a time t (unit: hour), whereby the Sn-plated steel sheet 10 according to the present embodiment can be obtained. That is, by causing Sn in the Sn-plated layer 2 to diffuse into the zirconium oxide layer by the heating treatment described in detail below, the diffused Sn is oxidized into tin oxide. By this heating treatment, the amount of tin oxide generated corresponds to the quantity of electricity required for the reduction described above, and the peak position of the binding energy of Sn3d$_{5/2}$ of the tin oxide by XPS is within the above range.

$$0.11 \times \exp(2400/T) < t < 0.65 \times \exp(2400/T) \quad \text{(Formula 101)}$$

$$308 < T < 373 \quad \text{(Formula 102)}$$

The heating method in the above manufacturing method is not limited at all, and for example, a known heating method such as atmospheric heating, induction heating, and energization heating can be applied. Here, the heating temperature needs to be higher than 308 K and lower than 373 K (that is, higher than 35° C. and lower than 100° C.) as shown in Formula 102. In a case where the heating temperature is 308 K or lower, the tin oxide is formed unevenly, and the performance is not improved. On the other hand, in a case where the heating temperature is 373 K or more, the structure of the tin oxide changes and the external appearance deteriorates, which is not suitable.

Here. Formula 101 was experimentally obtained by the present inventors by verifying whether or not the obtained Sn-plated steel sheet 10 was within the range of the present embodiment while changing each of the heating temperature and the heating time during the heating treatment. That is, the present inventors manufactured the Sn-plated steel sheet 10 while changing each of the heating temperature T (K) and the heating time t (hour) during the heating treatment, and verified whether or not the obtained the Sn-plated steel sheet 10 was within the range of the present embodiment. Then, the obtained verification results were plotted at positions corresponding to the heating conditions of each Sn-plated steel sheet 10 on a coordinate plane defined by the heating time t (hour) and the heating temperature T (K). Thereafter, in order to obtain a curve providing a boundary of a region falling within the range of the present embodiment, a non-linear least squares method was applied to the plot on the coordinate plane within the range of the heating temperature T (K) defined by Formula 102 using a known numerical value calculation application. Through such preliminary verification, the present inventors were able to obtain the relationship represented by Formula 101.

As a result of the above examination by the present inventors, it became clear that the heating temperature T [K] and the heating time t [hour] in the heating treatment step preferably satisfy Formula 103, and more preferably satisfy Formula 104.

$$0.22 \times \exp(2400/T) < t < 0.55 \times \exp(2400/T) \quad \text{(Formula 103)}$$

$$0.33 \times \exp(2400) < t < 0.44 \times \exp(2400/T) \quad \text{(Formula 104)}$$

The temperature rising rate and the cooling rate in the heating treatment step are not particularly limited, and may be appropriately set according to a known method. The heating atmosphere is not particularly limited as long as the atmosphere contains oxygen, but the water vapor content in the atmosphere containing oxygen is preferably in a range of 60 to 90 vol %. It is considered that by performing the heating treatment in such a range, the tin oxide is more uniformly generated, and the performance is improved.

EXAMPLES

Next, the Sn-plated steel sheet 10 and the method for manufacturing the Sn-plated steel sheet 10 according to the present embodiment will be specifically described with reference to examples. In addition, the examples shown below are merely examples, and the Sn-plated steel sheet and the method for manufacturing the Sn-plated steel sheet according to the present invention are not limited only to the following examples.

Example 1

<Test Material>

A low carbon cold-rolled steel sheet (corresponding to the steel sheet 1) having a sheet thickness of 0.2 mm was subjected to, as pretreatments, electrolytic alkaline degreasing, water washing, dilute sulfuric acid immersion pickling, and water washing, then subjected to electro Sn plating using a phenolsulfonic acid bath, and thereafter subjected to a heating and melting treatment. The adhesion amount of the Sn plating was about 2.8 g/m² per surface as a standard, but for some test materials, the adhesion amount of the Sn plating was changed by changing the energization time. In addition, a test material that was not subjected to the heating and melting treatment after the electro Sn plating was also manufactured. The adhesion amount of the Sn plating was specified by an X-ray method fluorescence measurement (ZSX Primus manufactured by Rigaku Corporation).

The Sn-plated steel sheet produced as described above was subjected to cathodic electrolysis in an aqueous solution containing zirconium fluoride to form a zirconium oxide layer on the Sn-plated steel sheet. The zirconium concentration in the cathode electrolyte was set to 1400 ppm. In addition, the bath temperature of the cathode electrolyte was adjusted to be 35° C., the pH value of the cathode electrolyte was adjusted to be 3 or more and 5 or less, and the current density and the cathodic electrolysis time were appropriately adjusted according to the target adhesion amount of Zr. The current density and the cathodic electrolysis time during the production of each test material are as shown in Table 1 below.

Furthermore, the Sn-plated steel sheet on which the zirconium oxide layer was formed was held at various heating temperatures and heating times as shown in Table 1 below to form a film layer containing a zirconium oxide and a tin oxide. For comparison, a test material (No. 1B and No. 3B) in which only a zirconium oxide layer was formed and no heating treatment was performed, and a test material (No. 7B) in which no zirconium oxide was formed and only a heating treatment was performed were also produced. Some of the test materials were subjected to an anodic electrolysis treatment in an aqueous solution of sodium carbonate before the formation of the zirconium oxide to change the structure of the tin oxide (No. 5B and No. 6B). Various evaluations shown below were performed on the Sn-plated steel sheets produced as described above. In addition, in some of the test materials, a zirconium oxide was formed by an alternating electrolytic treatment in which cathodic electrolysis and anodic electrolysis were alternately repeated in an aqueous solution containing zirconium fluoride (No. 9B).

[Adhesion Amount of Zr]

The adhesion amount of Zr per surface in the film layer of each of the test materials was measured by an X-ray fluorescence method using ZSX Primus manufactured by Rigaku Corporation. The obtained adhesion amounts of Zr are collectively shown in Table 1 below.

[Amount of Tin Oxide]

Each of the test materials was subjected to cathodic electrolysis at a constant current of 0.06 mA/cm² in a 0.001 mol/L aqueous solution of hydrobromic acid from which dissolved oxygen had been removed by bubbling of nitrogen gas, and the quantity of electricity required for reduction of the tin oxide was measured from the product of the time and current value required to reduce and remove the tin oxide. The measured quantities of electricity are collectively shown in the column "Amount of tin oxide" in Table 1 below.

[Peak Position in XPS]

For each of the test materials, the peak position of the binding energy of $Sn3d_{5/2}$ was measured using XPS (PHI Quantera SXM manufactured by ULVAC-PH, Inc.), and the shift amount of the peak position from the peak position of the binding energy of metal Sn was calculated. The obtained shift amounts are collectively shown in the column "Peak position of binding energy of $Sn3d_{5/2}$" in Table 1 below.

[Yellowing Resistance]

The yellowing resistance was evaluated as follows.

Each of the test materials produced as described above was placed in a thermo-hygrostat kept at 40° C. and a relative humidity of 80% for 4 weeks to perform a humidity test, and a change Δb* in color coordinate b* value before and after the humidity test was obtained and evaluated. Changes Δb* of 1 or less, more than 1 and 2 or less, and 2 to 3 were given 3 points, 2 points, and 1 point, respectively. Changes Δb* of more than 3 were given 0 points, and a point of 1 or more in the evaluation was regarded as pass. The color coordinates b* were measured using a commercially available color difference meter, SC-GV5 manufactured by Suga Test Instruments Co., Ltd. The measurement conditions for the color coordinates b* were set to a light source C, total reflection, and a measurement diameter of 30 mm.

[Sulphide Stain Resistance]

The sulphide stain resistance was evaluated as follows.

A commercially available epoxy resin coating for a can was applied in a dry mass of 7 g/m² onto the surface of each of the test materials produced as described above, then baked at 200° C. for 10 minutes, and left at room temperature for 24 hours. Thereafter, each of the obtained test materials was cut into a predetermined size, immersed in an aqueous solution containing each of 0.3 mass % of sodium dihydrogen phosphate, 0.7 mass % of sodium hydrogen phosphate, and 0.6 mass % of L-cysteine hydrochloride, and subjected to a retort treatment in a sealed container at 121° C. for 60 minutes, and the external appearance after the test was evaluated. When no change in external appearance was recognized before and after the test, 2 points were given, when slight staining was recognized (when the stained area was 10% or less), 1 point was given, and when staining was recognized in a region of more than 10% of the test surface, 0 points were given. A point of 1 or more in the evaluation was regarded as pass.

[Coating Film Adhesion]

The coating film adhesion was evaluated as follows.

After each of the test materials produced as described above was subjected to a humidity test by the method described above in [Yellowing Resistance], a commercially available epoxy resin coating for a can was applied in a dry mass of 7 g/m² onto the surface, baked at 200° C. for 10 minutes, and left at room temperature for 24 hours. Thereafter, for each of the obtained test materials, scratches reaching the surface of the steel sheet were input in a grid pattern (seven scratches in each of longitudinal and transverse directions at intervals of 3 mm), and a peeling test was performed on the portion for evaluation. When the coating film of the taped portion was not completely peeled off, 2 points were given, when peeling of the coating film in the periphery of the scratched portions in the grid pattern was recognized, 1 point was given, when peeling of the coating film in squares of the grid pattern was recognized, 0 points were given, and a point of 1 or more in the evaluation was regarded as pass.

[Corrosion Resistance After Coating]

The corrosion resistance after coating was evaluated as follows.

A commercially available epoxy resin coating for a can was applied in a dry mass of 7 g/m² onto the surface of each of the test materials produced by the method described above in "Coating Film Adhesion" and subjected to a humidity test, then baked at 200° C. for 10 minutes, and left at room temperature for 24 hours. Thereafter, each of the obtained test materials was cut into a size of 40 mm×40 mm, and immersed in a commercially available tomato juice under an environment at a temperature of 60° C. for 7 days, and the presence or absence of occurrence of rust was visually evaluated. When no rust was recognized, 2 points were given, when slight rust was recognized (when the rusted area was 5% or less), 1 point was given, when 5% or more of rust was recognized, 0 points were given, and a point of 1 or more in the evaluation was regarded as pass.

[Comprehensive Performance]

As an evaluation of the comprehensive performance, the sum of the grades of the various performances was obtained, and a case where the value of the sum was 8 points or 9 points was regarded as "Very Good", a case of 6 points or 7 points was regarded as "Good", a case of 4 points or 5 points was regarded as "Fair", a case where any one of the performances had 0 points was set to a value of the sum of 0 points and regarded as "Bad", and the grades Very Good, Good, and Fair were regarded as pass.

TABLE 1

| No | Cathodic electrolysis treatment Current density (A/dm²) | Cathodic electrolysis treatment Electrolysis time (sec) | Heating treatment Heating temperature (K) | Heating treatment Heating time (hr) | Heating treatment Formula (101) established | Adhesion amount of Sn (g/m²) | Adhesion amount of Zr (mg/m²) | Film layer Amount of tin oxide (mC/cm²) | Film layer Peak position of binding energy of Sn3d$_{5/2}$ (eV) |
|---|---|---|---|---|---|---|---|---|---|
| 1A | 3 | 1 | 353 | 450 | Satisfied | 2.8 | 2.4 | 5.2 | 1.4 |
| 2A | 3 | 1 | 333 | 500 | Satisfied | 2.9 | 2.2 | 9.8 | 1.5 |
| 3A | 3 | 1 | 373 | 300 | Satisfied | 2.7 | 2.1 | 19.8 | 1.5 |
| 4A | 6 | 1 | 353 | 350 | Satisfied | 2.8 | 5.2 | 5.1 | 1.5 |
| 5A | 6 | 1 | 353 | 350 | Satisfied | 2.8 | 5.4 | 9.9 | 1.5 |
| 6A | 6 | 1 | 373 | 300 | Satisfied | 2.8 | 5.2 | 19.8 | 1.5 |
| 7A | 10 | 1 | 353 | 450 | Satisfied | 2.9 | 14.8 | 5.1 | 1.5 |
| 8A | 10 | 1 | 353 | 450 | Satisfied | 2.9 | 15.1 | 9.6 | 1.5 |
| 9A | 10 | 1 | 373 | 300 | Satisfied | 2.8 | 14.9 | 19.8 | 1.5 |
| 10A | 20 | 1 | 373 | 70 | Satisfied | 2.7 | 28.8 | 5.1 | 1.5 |
| 11A | 20 | 1 | 373 | 70 | Satisfied | 2.7 | 29.6 | 9.5 | 1.5 |
| 12A | 20 | 1 | 333 | 850 | Satisfied | 2.9 | 29.8 | 19.2 | 1.5 |
| 13A | 6 | 1 | 310 | 300 | Satisfied | 3.0 | 5.8 | 5.1 | 1.5 |
| 14A | 6 | 1 | 310 | 600 | Satisfied | 2.7 | 5.4 | 8.5 | 1.4 |
| 15A | 6 | 1 | 310 | 1200 | Satisfied | 2.9 | 6.0 | 15.2 | 1.5 |
| 1B | 3 | 1 | — | — | Not satisfied | 2.8 | 2.3 | 2.3 | 1.6 |
| 2B | 3 | 1 | 393 | 900 | Not satisfied | 2.8 | 2.2 | 25.1 | 1.6 |
| 3B | 20 | 1 | — | — | Not satisfied | 2.7 | 27.4 | 2.5 | 1.5 |
| 4B | 20 | 1 | 393 | 900 | Not satisfied | 2.9 | 26.5 | 25.2 | 1.6 |
| 5B | 3 | 1 | 333 | 500 | Satisfied | 2.8 | 2.5 | 9.6 | 1.8 |
| 6B | 20 | 1 | 333 | 500 | Satisfied | 2.9 | 28.6 | 9.5 | 1.8 |
| 7B | — | — | 333 | 200 | Satisfied | 2.8 | 0.5 | 8.4 | 1.5 |
| 8B | 20 | 2 | 373 | 400 | Satisfied | 2.7 | 41.2 | 9.4 | 1.5 |
| 9B | 10 | 1 | — | — | Not satisfied | 2.7 | 8.1 | 2.2 | 1.5 |

| No | Evaluation result Yellowing resistance | Sulphide stain resistance | Coating film adhesion | Corrosion resistance after coating | Comprehensive performance | Comprehensive performance determination | Note |
|---|---|---|---|---|---|---|---|
| 1A | 3 | 1 | 2 | 1 | 7 | Good | Invention Example |
| 2A | 3 | 2 | 2 | 2 | 9 | Very Good | Invention Example |
| 3A | 3 | 2 | 1 | 1 | 7 | Good | Invention Example |
| 4A | 2 | 2 | 2 | 2 | 8 | Very Good | Invention Example |
| 5A | 3 | 2 | 2 | 2 | 9 | Very Good | Invention Example |
| 6A | 3 | 2 | 1 | 1 | 7 | Good | Invention Example |

TABLE 1-continued

| | | | | | | | |
|---|---|---|---|---|---|---|---|
| 7A | 1 | 2 | 2 | 2 | 7 | Good | Invention Example |
| 8A | 2 | 2 | 1 | 2 | 7 | Good | Invention Example |
| 9A | 3 | 2 | 1 | 1 | 7 | Good | Invention Example |
| 10A | 1 | 2 | 1 | 2 | 6 | Good | Invention Example |
| 11A | 1 | 2 | 1 | 2 | 6 | Good | Invention Example |
| 12A | 1 | 2 | 1 | 1 | 5 | Fair | Invention Example |
| 13A | 3 | 1 | 2 | 1 | 7 | Good | Invention Example |
| 14A | 3 | 2 | 2 | 2 | 9 | Very Good | Invention Example |
| 15A | 3 | 2 | 1 | 1 | 7 | Good | Invention Example |
| 1B | 0 | 0 | 2 | 1 | 0 | Bad | Comparative Example |
| 2B | 3 | 1 | 0 | 1 | 0 | Bad | Comparative Example |
| 3B | 0 | 0 | 2 | 2 | 0 | Bad | Comparative Example |
| 4B | 1 | 2 | 0 | 1 | 0 | Bad | Comparative Example |
| 5B | 0 | 1 | 0 | 1 | 0 | Bad | Comparative Example |
| 6B | 0 | 3 | 0 | 2 | 0 | Bad | Comparative Example |
| 7B | 3 | 0 | 2 | 0 | 0 | Bad | Comparative Example |
| 8B | 1 | 2 | 0 | 2 | 0 | Bad | Comparative Example |
| 9B | 0 | 0 | 1 | 1 | 0 | Bad | Comparative Example |

As is clear from Table 1 above, it can be seen that the test materials corresponding to the invention examples are good in any of the performances. On the other hand, it can be seen that the test materials corresponding to the comparative examples are inferior in any of yellowing resistance, coating film adhesion, sulphide stain resistance, and corrosion resistance after coating.

Example 2

A low carbon cold-rolled steel sheet having a sheet thickness of 0.2 mm was subjected to, as pretreatments, electrolytic alkaline degreasing, water washing, dilute sulfuric acid immersion pickling, and water washing, then subjected to electro Sn plating using a phenolsulfonic acid bath, and thereafter subjected to a heating and melting treatment. The adhesion amount of Sn was set to 2.8 g/m² per surface.

The Sn-plated steel sheet produced as described above was subjected to cathodic electrolysis in an aqueous solution containing zirconium fluoride to form a zirconium oxide layer on the Sn-plated steel sheet. The zirconium concentration in the cathode electrolyte was set to 1400 ppm. In addition, the bath temperature of the cathode electrolyte was adjusted to be 35° C., the pH value of the cathode electrolyte was adjusted to be 3 or more and 5 or less, and the current density and the cathodic electrolysis time were appropriately adjusted so that the adhesion amount of Zr became 5 mg/m².

Furthermore, the Sn-plated steel sheet on which the zirconium oxide layer was formed was held at various heating temperatures and heating times to form a film layer containing a zirconium oxide and a tin oxide, and each of the obtained Sn-plated steel sheets was used as a test material.

Figure 2:
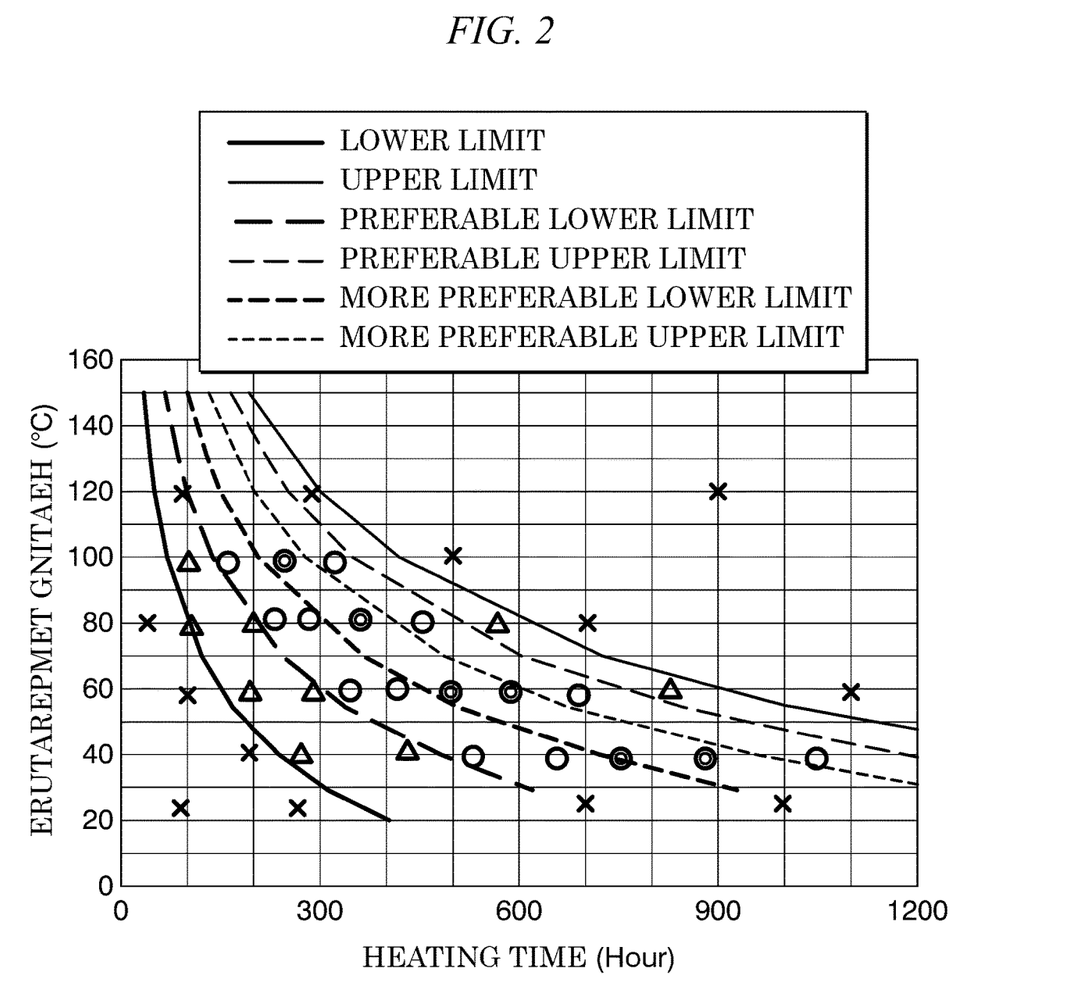
FIG. 2 is a graph showing the results in a case where a temperature and a time during a heating treatment were changed in Example 2.

For each of the obtained test materials, various performances were evaluated in the same manner as in the method described above in Example 1, and the comprehensive performance was evaluated from the total point in each evaluation item. The evaluation criteria for the comprehensive performance are the same as in Example 1. The results are summarized in Table 2 below. In addition, on a coordinate plane defined by the heating temperature T [° C.] and the heating time t [hour], the evaluation results of the obtained comprehensive performance were plotted at positions corresponding to the combination of the heating temperature and the heating time of each of the test materials. The obtained plot is shown in FIG. 2.

TABLE 2

| No | Current density (A/dm²) | Electrolysis time (sec) | Heating temperature T (K) | Heating temperature T (° C.) | Heating time (hr) | Formula (101) established | Comprehensive performance determination | Note |
|---|---|---|---|---|---|---|---|---|
| 21A | 6 | 1 | 373 | 100 | 250 | Satisfied | Very Good | Invention Example |
| 22A | 6 | 1 | 355 | 82 | 360 | Satisfied | Very Good | Invention Example |
| 23A | 6 | 1 | 333 | 60 | 500 | Satisfied | Very Good | Invention Example |

TABLE 2-continued

| No | Current density (A/dm$^2$) | Electrolysis time (sec) | Heating temperature T (K) | Heating temperature T (° C.) | Heating time (hr) | Formula (101) established | Comprehensive performance determination | Note |
|---|---|---|---|---|---|---|---|---|
| 24A | 6 | 1 | 331 | 58 | 590 | Satisfied | Very Good | Invention Example |
| 25A | 6 | 1 | 313 | 40 | 750 | Satisfied | Very Good | Invention Example |
| 26A | 6 | 1 | 311 | 38 | 880 | Satisfied | Very Good | Invention Example |
| 27A | 6 | 1 | 373 | 100 | 160 | Satisfied | Good | Invention Example |
| 28A | 6 | 1 | 355 | 82 | 230 | Satisfied | Good | Invention Example |
| 29A | 6 | 1 | 355 | 82 | 280 | Satisfied | Good | Invention Example |
| 30A | 6 | 1 | 333 | 60 | 340 | Satisfied | Good | Invention Example |
| 31A | 6 | 1 | 333 | 60 | 410 | Satisfied | Good | Invention Example |
| 32A | 6 | 1 | 353 | 80 | 450 | Satisfied | Good | Invention Example |
| 33A | 6 | 1 | 313 | 40 | 530 | Satisfied | Good | Invention Example |
| 34A | 6 | 1 | 313 | 40 | 660 | Satisfied | Good | Invention Example |
| 35A | 6 | 1 | 331 | 58 | 690 | Satisfied | Good | Invention Example |
| 36A | 6 | 1 | 313 | 40 | 1050 | Satisfied | Good | Invention Example |
| 37A | 6 | 1 | 372 | 99 | 315 | Satisfied | Good | Invention Example |
| 38A | 6 | 1 | 353 | 80 | 110 | Satisfied | Fair | Invention Example |
| 39A | 6 | 1 | 372 | 99 | 100 | Satisfied | Fair | Invention Example |
| 40A | 6 | 1 | 333 | 60 | 200 | Satisfied | Fair | Invention Example |
| 41A | 6 | 1 | 353 | 80 | 200 | Satisfied | Fair | Invention Example |
| 42A | 6 | 1 | 313 | 40 | 270 | Satisfied | Fair | Invention Example |
| 43A | 6 | 1 | 333 | 60 | 290 | Satisfied | Fair | Invention Example |
| 44A | 6 | 1 | 313 | 40 | 430 | Satisfied | Fair | Invention Example |
| 45A | 6 | 1 | 353 | 80 | 570 | Satisfied | Fair | Invention Example |
| 46A | 6 | 1 | 333 | 60 | 820 | Satisfied | Fair | Invention Example |
| 11B | 6 | 1 | 295 | 22 | 90 | Not satisfied | Bad | Comparative Example |
| 12B | 6 | 1 | 332 | 59 | 100 | Not satisfied | Bad | Comparative Example |
| 13B | 6 | 1 | 353 | 80 | 40 | Not satisfied | Bad | Comparative Example |
| 14B | 6 | 1 | 393 | 120 | 99 | Not satisfied | Bad | Comparative Example |
| 15B | 6 | 1 | 313 | 40 | 200 | Not satisfied | Bad | Comparative Example |
| 16B | 6 | 1 | 297 | 24 | 270 | Not satisfied | Bad | Comparative Example |
| 17B | 6 | 1 | 393 | 120 | 280 | Not satisfied | Bad | Comparative Example |
| 18B | 6 | 1 | 373 | 100 | 500 | Not satisfied | Bad | Comparative Example |
| 19B | 6 | 1 | 298 | 25 | 700 | Not satisfied | Bad | Comparative Example |
| 20B | 6 | 1 | 353 | 80 | 700 | Not satisfied | Bad | Comparative Example |
| 21B | 6 | 1 | 393 | 120 | 900 | Not satisfied | Bad | Comparative Example |
| 22B | 6 | 1 | 298 | 25 | 1000 | Not satisfied | Bad | Comparative Example |
| 23B | 6 | 1 | 333 | 60 | 1100 | Not satisfied | Bad | Comparative Example |

FIG. 2 collectively illustrates the curves defined by the leftmost side and the rightmost side in each of Formula 101, Formula 103, and Formula 104.

As is clear from FIG. 2, it can be seen that in a case where the heating treatment is performed under the conditions within the range of the present embodiment, good performance is obtained, whereas in a case where the heating treatment is performed under the conditions outside the range of the present embodiment, good performance cannot be obtained.

While the preferred embodiments of the present invention have been described in detail, the present invention is not limited to only such examples. It is obvious that those skilled in the art to which the present invention pertains can conceive various changes or modifications within the scope of the technical idea described in the claims, and it is understood that these also belong to the technical scope of the present invention.

INDUSTRIAL APPLICABILITY

As described above, since the Sn-plated steel sheet according to the present invention does not require a chromate treatment performed in the related art and is excellent in yellowing resistance, coating film adhesion, and sulphide stain resistance, the Sn-plated steel sheet according to the present invention can be widely used as an environment-friendly material for a can for food cans, beverage cans, and the like, and thus has extremely high industrial utility value.

BRIEF DESCRIPTION OF THE REFERENCE SYMBOLS

1 Steel sheet
2 Sn-plated layer
3 Base plated steel sheet
4 Film layer
10 Sn-plated steel sheet

The invention claimed is:
1. A Sn-plated steel sheet, comprising:
a base plated steel sheet having a steel sheet, and a Sn-plated layer on at least one surface of the steel sheet; and
a film layer which contains a zirconium oxide and a tin oxide and is positioned on the base plated steel sheet, where the Sn-plated layer and the film layer are formed in this order on at least one surface of the steel sheet,
wherein an adhesion amount of Sn per surface is 0.1 g/m$^2$ or more and 15 g/m$^2$ or less,
the adhesion amount of Sn per surface is a sum of an amount of Sn, which is present in the Sn-plated layer and not diffused into the film layer, and an amount of the tin oxide present in the film layer in terms of an amount of metal Sn,
an amount of the zirconium oxide in the film layer is in a range of 1 mg/m$^2$ or more and 30 mg/m$^2$ or less in terms of an amount of metal Zr,
a peak position of a binding energy of Sn3d$_{5/2}$ of the tin oxide by X-ray photoelectron spectroscopy in the film layer is within a range of 1.4 eV or more and less than 1.6 eV from a peak position of a binding energy of metal Sn, and a quantity of electricity required for reduction of the tin oxide is in a range of more than 5.0 mC/cm$^2$ and 20 mC/cm$^2$ or less, wherein the quantity of electricity required for reduction of the tin oxide is measured by:

providing a 0.001 mol/L aqueous solution of hydrobromic acid from which dissolved oxygen has been removed by bubbling of nitrogen gas;

subjecting the Sn-plated steel sheet to cathodic electrolysis in said aqueous solution, at a constant current of 0.06 mA/cm$^2$, and calculating the quantity of electricity required for the reduction of the tin oxide from the product of the time and current values required for reducing and removing the tin oxide.

2. A method for manufacturing a Sn-plated steel sheet according to claim 1, the method comprising:

a first step of forming a zirconium oxide layer containing a zirconium oxide on a base plated steel sheet which has a Sn-plated layer containing 0.1 g/m$^2$ or more and 15 g/m$^2$ or less of Sn formed on at least one surface of a steel sheet, by performing an immersion treatment into a solution containing zirconium ions, or a cathodic electrolysis treatment in a solution containing zirconium ions; and a second step of, after the first step, subjecting the base plated steel sheet on which the zirconium oxide layer is formed to a heating treatment in an atmosphere containing oxygen under conditions satisfying both Formula 1 and Formula 2 regarding a heating temperature T in units of K and a heating time t in units of hours $$0.11 \times \exp(2400/T) < t < 0.65 \times \exp(2400/T) \quad \text{(Formula 1)}$$

$$308 < T < 373 \quad \text{(Formula 2)}.$$

3. The method for manufacturing a Sn-plated steel sheet according to claim 2, wherein the heating treatment in the second step is performed in an atmosphere containing oxygen and having a water vapor content in a range of 60 vol % or more and 90 vol % or less.

4. The method for manufacturing a Sn-plated steel sheet according to claim 3, wherein a concentration of the zirconium ions in the solution containing the zirconium ions is 100 ppm or more and 4,000 ppm or less, and a pH value of the solution containing the zirconium ions is 3 or more and 5 or less.

5. The method for manufacturing a Sn-plated steel sheet according to claim 4, wherein, in the first step, the zirconium oxide layer is formed by the cathodic electrolysis treatment, and a current density in the cathodic electrolysis treatment is set to 0.05 A/dm$^2$ or more and 50 A/dm$^2$ or less.

6. The method for manufacturing a Sn-plated steel sheet according to claim 3, wherein, in the first step, the zirconium oxide layer is formed by the cathodic electrolysis treatment, and a current density in the cathodic electrolysis treatment is set to 0.05 A/dm$^2$ or more and 50 A/dm$^2$ or less.

7. The method for manufacturing a Sn-plated steel sheet according to claim 2, wherein a concentration of the zirconium ions in the solution containing the zirconium ions is 100 ppm or more and 4,000 ppm or less, and a pH value of the solution containing the zirconium ions is 3 or more and 5 or less.

8. The method for manufacturing a Sn-plated steel sheet according to claim 7, wherein, in the first step, the zirconium oxide layer is formed by the cathodic electrolysis treatment, and a current density in the cathodic electrolysis treatment is set to 0.05 A/dm$^2$ or more and 50 A/dm$^2$ or less.

9. The method for manufacturing a Sn-plated steel sheet according to claim 2, wherein, in the first step, the zirconium oxide layer is formed by the cathodic electrolysis treatment, and a current density in the cathodic electrolysis treatment is set to 0.05 A/dm$^2$ or more and 50 A/dm$^2$ or less.

* * * * *